(12) United States Patent
Black

(10) Patent No.: US 6,581,295 B1
(45) Date of Patent: Jun. 24, 2003

(54) MATERIAL DISPENSING APPARATUS WITH LINE LEVEL

(75) Inventor: Charles D. Black, Williston, ND (US)

(73) Assignee: New Products Marketing Corporation, Williston, ND (US)

( * ) Notice: Subject to any disclaimer, the term of this patent is extended or adjusted under 35 U.S.C. 154(b) by 0 days.

(21) Appl. No.: 10/100,305

(22) Filed: Mar. 15, 2002

(51) Int. Cl.⁷ .................................................. G01C 9/26
(52) U.S. Cl. .......................... 33/369; 33/413; 33/1 LE
(58) Field of Search ............................... 33/1 LE, 413, 33/339, 347, 369, 374, 375, 376, 383, 384; 269/47, 48, 50

(56) References Cited

U.S. PATENT DOCUMENTS

| | | | | |
|---|---|---|---|---|
| 839,751 A | * | 12/1906 | Grunewald | 33/369 |
| 1,369,652 A | * | 2/1921 | Hall | 33/369 |
| 1,489,572 A | * | 4/1924 | Bennewitz | 33/376 |
| 2,708,317 A | * | 5/1955 | Warne | 33/384 |
| 3,225,451 A | * | 12/1965 | Olexson et al. | 33/347 |
| 3,593,428 A | * | 7/1971 | Jacoff | 33/379 |
| 3,828,438 A | * | 8/1974 | Raymond, Jr. | 33/342 |
| 3,878,617 A | * | 4/1975 | West et al. | 33/369 |
| 4,068,386 A | | 1/1978 | Streeter | 33/369 |
| 4,189,844 A | | 2/1980 | Riggins, Sr. | 33/414 |
| 4,228,588 A | | 10/1980 | Horton, Jr. | 33/1 H |
| 4,274,203 A | | 6/1981 | Vasile | 33/1 LE |
| 4,462,167 A | | 7/1984 | Huat | 33/339 |
| 5,165,650 A | * | 11/1992 | Letizia | 33/379 |
| 5,482,095 A | | 1/1996 | de Chollet | 141/380 |
| 5,659,967 A | | 8/1997 | Dufour | 33/369 |
| 5,664,739 A | | 9/1997 | Black et al. | 242/588.2 |
| 5,778,544 A | * | 7/1998 | Pherigo | 33/389 |
| 5,927,635 A | | 7/1999 | Black et al. | 242/395 |
| 6,138,369 A | * | 10/2000 | Mushin | 33/379 |
| 6,148,529 A | | 11/2000 | Kennedy | 33/374 |
| 6,209,219 B1 | | 4/2001 | Wakefield et al. | 33/761 |

\* cited by examiner

*Primary Examiner*—G. Bradley Bennett
(74) *Attorney, Agent, or Firm*—Michael S. Neustel

(57) ABSTRACT

A material dispensing apparatus with line level for conveniently storing and providing access to a line level within a material dispenser. The material dispensing apparatus with line level includes a handle structure formed for removably receiving the line level. The handle structure is preferably comprised of a handle post structure having a receiver slot for receiving the line level within. A plurality of first nubs extend inwardly from the walls of the receiver slot to selectively retain the line level within the receiver slot. A handle cover is removably attachable about the handle post structure for enclosing the handle post structure during usage of the material dispenser structure.

20 Claims, 14 Drawing Sheets

MATERIAL DISPENSING APPARATUS WITH LINE LEVEL

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to material dispensers and more specifically it relates to a material dispensing apparatus with line level for conveniently storing and providing access to a line level within a material dispenser.

2. Description of Related Art

Line levels and elongate material dispensers have been in use for years. Construction workers, including carpenters, masonry workers, steel workers, and the like frequently use elongate lengths of heavy string, often referred to as "construction line", pulled taut between various points in order to establish straight lines. Straight lines are often necessary to aide in taking measurements or to properly align structural elements during construction. The workers often times utilize a line level that removably attaches to the taut construction line to ensure the levelness of the construction line.

Conventional elongate material dispensers commonly have a handle structure with a structure for rotatably receiving a spool of elongate material such as but not limited to string, cord or rope. Elongate material dispensers are manufactured in various styles that are all capable of dispensing elongate material. Examples of elongate material dispensers are disclosed in U.S. Pat. No. 5,664,739 to Black et al. and U.S. Pat. No. 5,927,635 to Black et al.

Line levels have also been in use for years and are utilized to determine whether a string placed in tension is level. Line levels have two opposing hook members that are typically reversed to provide a positive catch upon the string as best illustrated in FIG. 3 of the drawings. U.S. Pat. No. 5,659,967 to Dufour and U.S. Pat. No. 4,068,386 to Streeter illustrate line levels suitable for usage with the present invention.

The main problem with conventional material dispensers and line levels is that there is no convenient location to store and provide access to the line levels during non-usage of the line level. A further problem with the prior art is that line levels are often times misplaced, lost, broken or damaged since there is no convenient storage location. Another problem is that it can be time consuming for workers on a construction site to locate a line level which may be in a completely separate location from the elongate material dispenser.

Examples of patented devices which are related to the present invention include U.S. Pat. No. 4,189,844 to Riggins, Sr.; U.S. Pat No. 4,228,588 to Horton, Jr.; U.S. Pat. No. 6,148,529 to Kennedy; U.S. Pat. 6,209,219 to Wakefield et al.; U.S. Pat. No. 4,462,167 to Huat; U.S. Pat. No. 4,274,203 to Vasile; and U.S. Pat. No. 5,482,095 to de Chollet.

While these devices may be suitable for the particular purpose to which they address, they are not as suitable for conveniently storing and providing access to a line level within a material dispenser. Conventional elongate material dispensers do not provide a convenient location to store and provide access to a line level during non-usage of the line level.

In these respects, the material dispensing apparatus with line level according to the present invention substantially departs from the conventional concepts and designs of the prior art, and in so doing provides an apparatus primarily developed for the purpose of conveniently storing and providing access to a line level within a material dispenser.

BRIEF SUMMARY OF THE INVENTION

In view of the foregoing disadvantages inherent in the known types of material dispensers now present in the prior art, the present invention provides a new material dispensing apparatus with line level construction wherein the same can be utilized for conveniently storing and providing access to a line level within a material dispenser.

The general purpose of the present invention, which will be described subsequently in greater detail, is to provide a new material dispensing apparatus with line level that has many of the advantages of the material dispensers mentioned heretofore and many novel features that result in a new material dispensing apparatus with line level which is not anticipated, rendered obvious, suggested, or even implied by any of the prior art material dispensers, either alone or in any combination thereof.

To attain this, the present invention generally comprises a handle structure formed for removably receiving the line level. The handle structure is preferably comprised of a handle post structure having a receiver slot for receiving the line level within. A plurality of first nubs extend inwardly from the walls of the receiver slot to selectively retain the line level within the receiver slot. A handle cover is removably attachable about the handle post structure for enclosing the handle post structure during usage of the material dispenser structure.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a material dispensing apparatus with line level that will overcome the shortcomings of the prior art devices.

A second object is to provide a material dispensing apparatus with line level for conveniently storing and providing access to a line level within a material dispenser.

Another object is to provide a material dispensing apparatus with line level that provides convenient access to a line level at all times during the usage of an elongate material dispenser.

An additional object is to provide a material dispensing apparatus with line level that reduces the likelihood of accidentally losing, damaging, misplacing or destroying a line level.

A further object is to provide a material dispensing apparatus with line level that reduces employee time on construction projects.

Another object is to provide a material dispensing apparatus with line level that is capable of being utilized with various types of line levels.

A further object is to provide a material dispensing apparatus with line level that may be utilized within various styles of elongate material dispensers.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
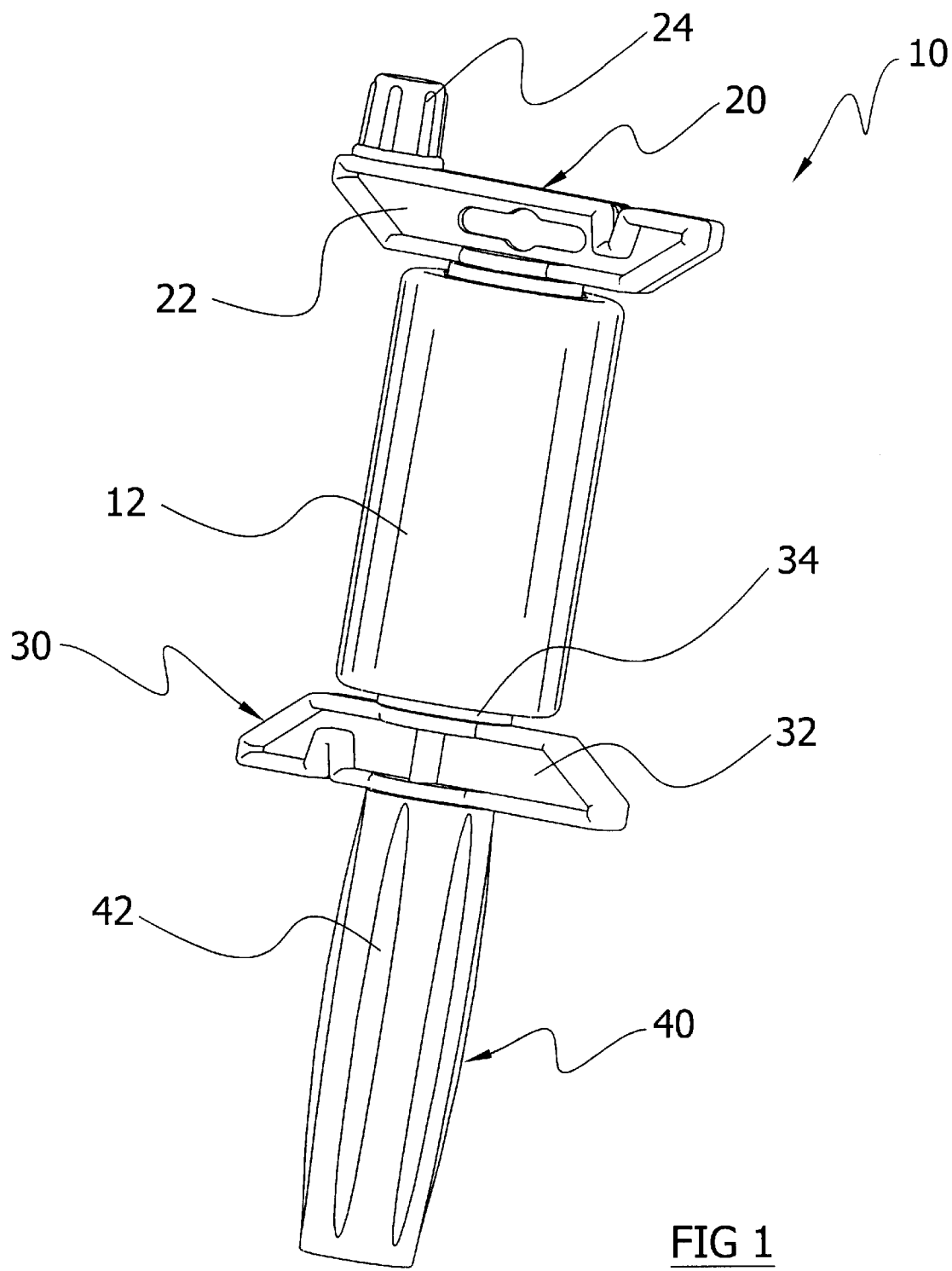
FIG. 1 is an upper perspective view of a first embodiment of the present invention.

Turning now descriptively to the drawings, in which similar reference characters denote similar elements throughout the several views, FIGS. 1 through 13 illustrate a material dispensing apparatus with line level 10, which comprises a handle structure 40 formed for removably receiving the line level 50. The handle structure 40 is preferably comprised of a handle post structure 44 having a receiver slot 49 for receiving the line level 50 within. A plurality of first nubs 60a–d extend inwardly from the walls of the receiver slot 49 to selectively retain the line level 50 within the receiver slot 49. A handle cover 42 is removably attachable about the handle post structure 44 for enclosing the handle post structure 44 during usage of the material dispenser structure.

As shown in FIGS. 3, 9, 12 and 13 of the drawings, the line level 50 is basically comprised of a housing structure containing a liquid level indicator within, a first hook 52 attached to a first end of the housing structure and a second hook 54 attached to the opposing end of the housing structure.

U.S. Pat. No. 5,659,967 to Dufour and U.S. Pat. No. 4,068,386 to Streeter illustrate line levels 50 suitable for usage with the present invention and are hereby incorporated by reference for the purpose of disclosing the structure and functionality of the line level 50. The line level 50 may have various other structures and sizes which are well known in the art of line levels 50.

As shown in FIGS. 1, 3, 5, 8, 9, 10 and 12 of the drawings, the material dispenser for dispensing the construction line is preferably comprised of a handle structure 40 attached to a frame. The frame is preferably comprised of a second shoulder 30, a shank 34 extending from the second shoulder 30, and a first shoulder 20 attached to the distal end of the shank 34. The frame may be comprised of various other structures not illustrated in the drawings capable of receiving a spool and/or elongate material. The first shoulder 20 preferably includes a first body 22 and a first handle 24 rotatably attached to the first body 22. The second shoulder 30 preferably includes a second body 32 connected to the shank 34.

A spool 12 of elongate material is attached about the shank 34 in a rotatable or non-rotatable manner. The handle structure 40 is preferably a rotatable structure to allow for the dispensing of the elongate material from the spool 12 in an easy manner, however the handle structure 40 may be non-rotatably attached to the shank 34. The first shoulder 20 and the second shoulder 30 are preferably comprised of a structure broader than the shank 34 for retaining the spool 12 in the desired location. The spool 12 preferably contains an elongate material such as but not limited to construction line, string, cable and the like. It can be appreciated that various other types of structures may be utilized that do not utilize a spool 12 for retaining and dispensing the elongate material.

Examples of elongate material dispensers are disclosed in U.S. Pat. No. 5,664,739 to Black et al. and U.S. Pat. No. 5,927,635 to Black et al. which are hereby incorporated by reference for the purpose of disclosing the overall structure and functionality of the material dispenser. It can be appreciated that the material dispenser may be comprised of a various other structures not illustrated within the drawings, the '739 patent and the '635 patent. The present invention is suitable for usage with various other configurations and embodiments not illustrated within the drawings.

Figure 3:
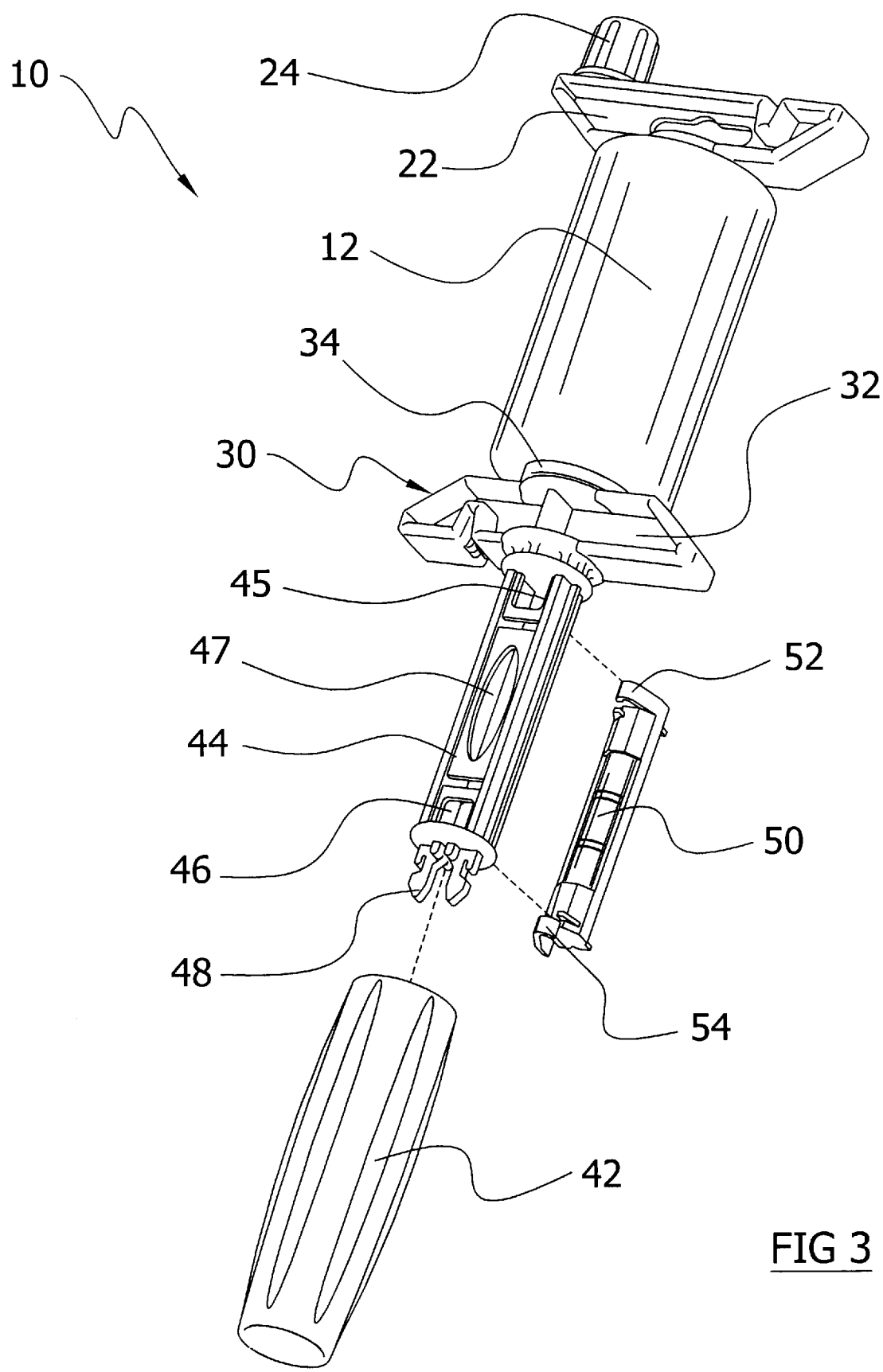
FIG. 3 is an exploded upper perspective view of the present invention.
Figure 4A:
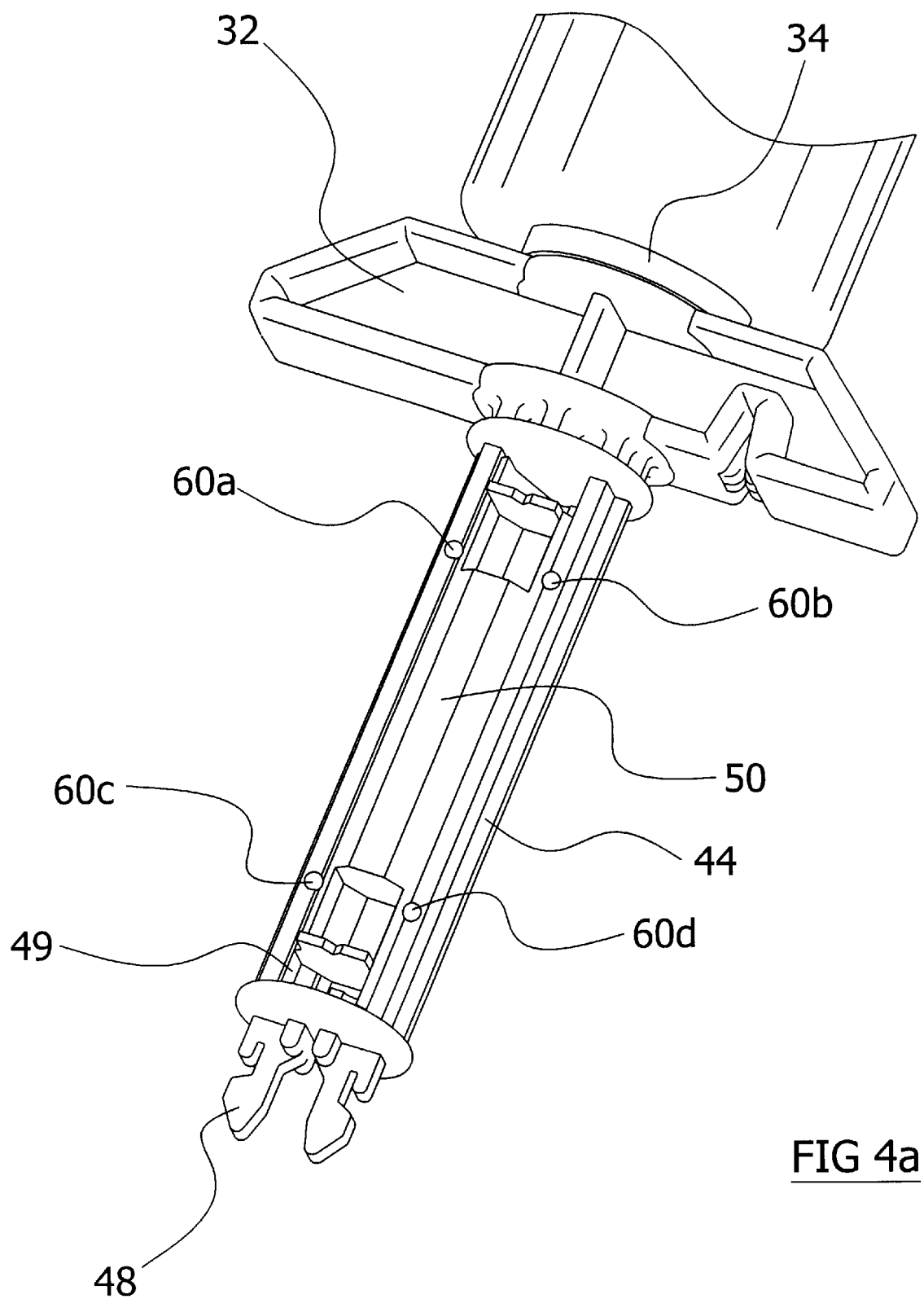
FIG. 4a is an upper perspective view of the present invention with the handle cover removed and the line level secured within the handle post structure.
Figure 4B:
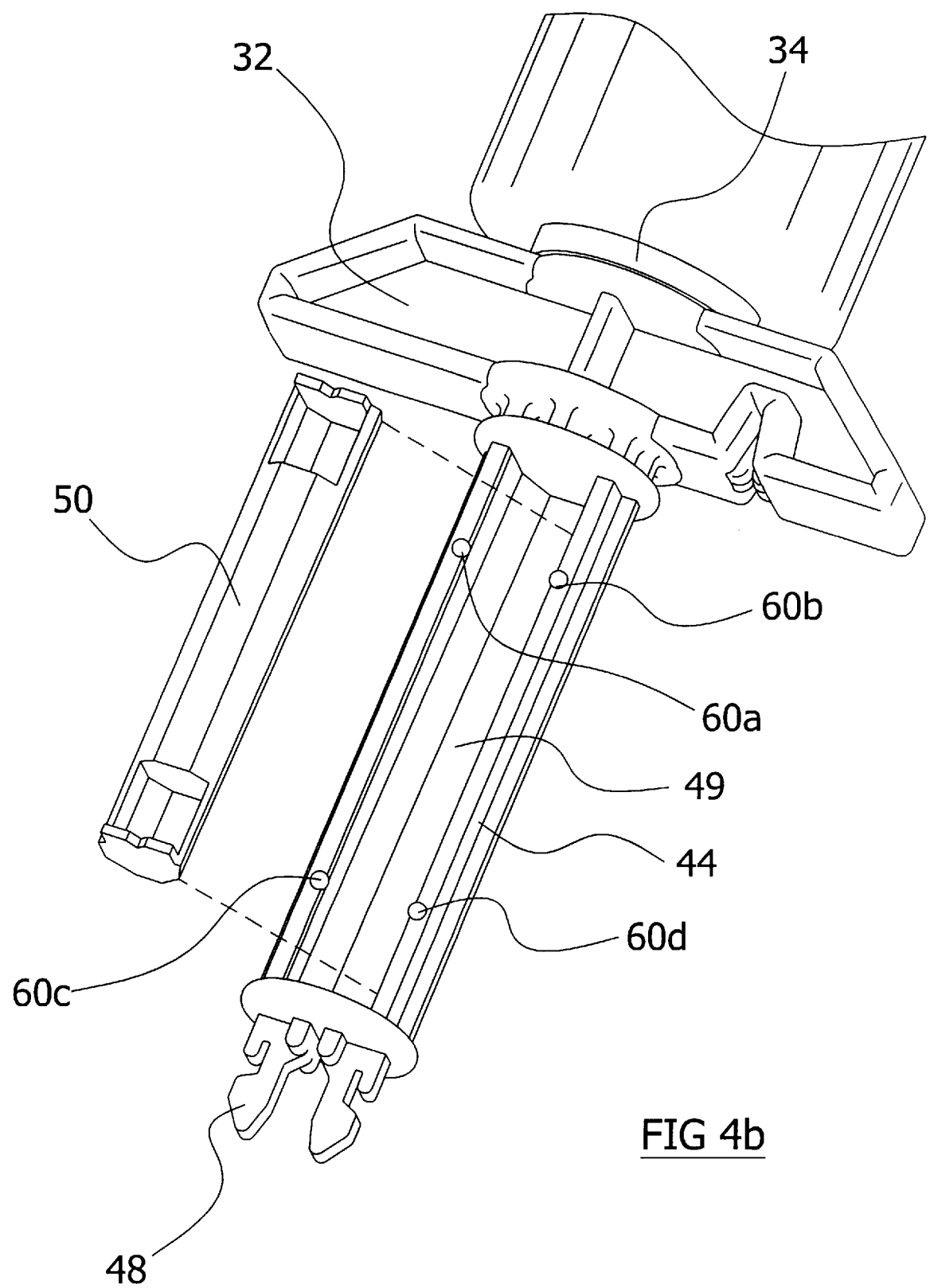
FIG. 4b is an upper perspective view of the present invention with the handle cover removed and the line level removed from the handle post structure.
Figure 5:
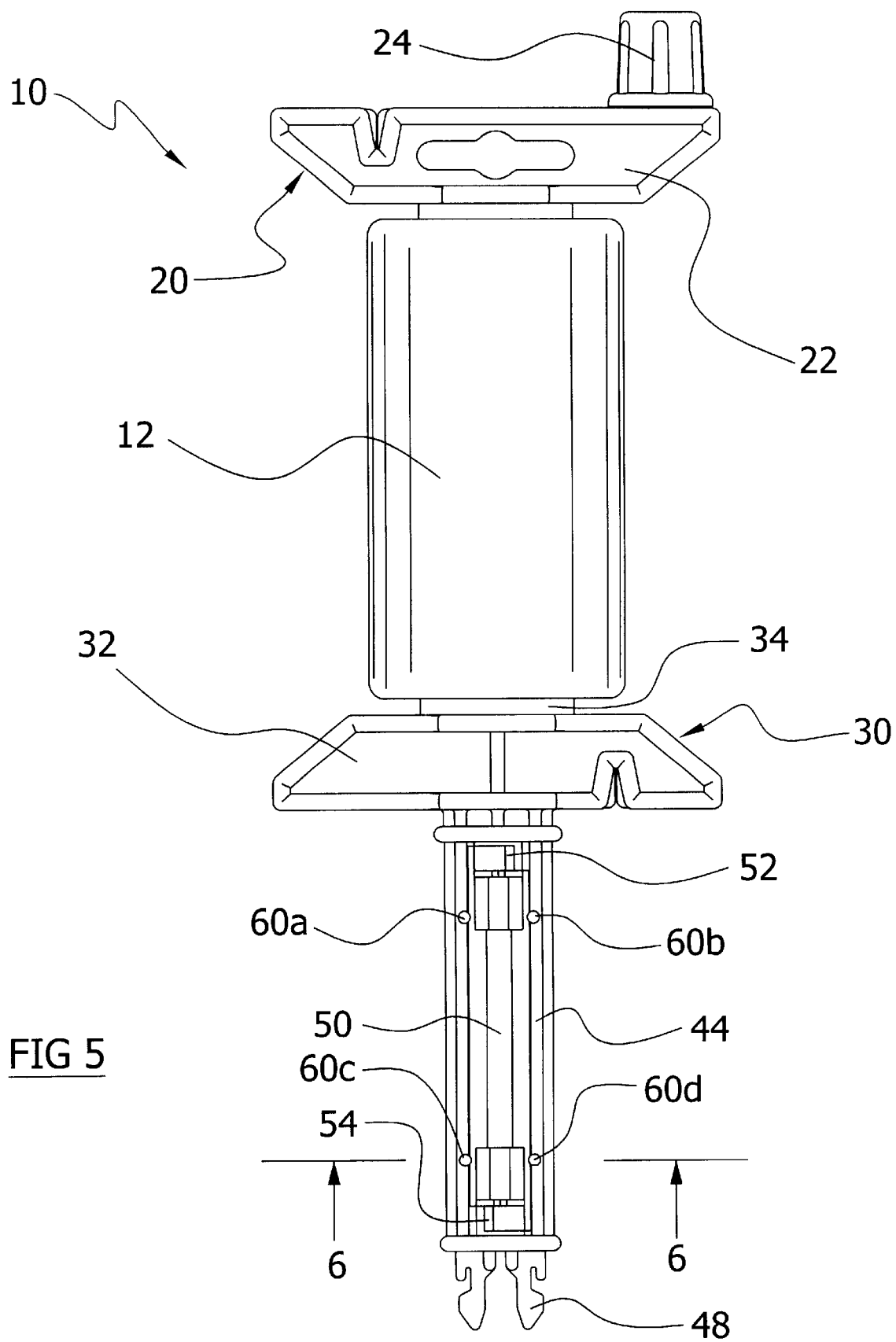
FIG. 5 is a top view of the present invention with the handle cover removed.

The handle structure 40 has a handle post structure 44 extending from the second shoulder 30 as best illustrated in FIGS. 3 through 5 of the drawings. The handle post structure 44 is an elongate structure containing a receiver slot 49 within for removably receiving the line level 50 as best illustrated in FIG. 4b of the drawings.

Figure 7:
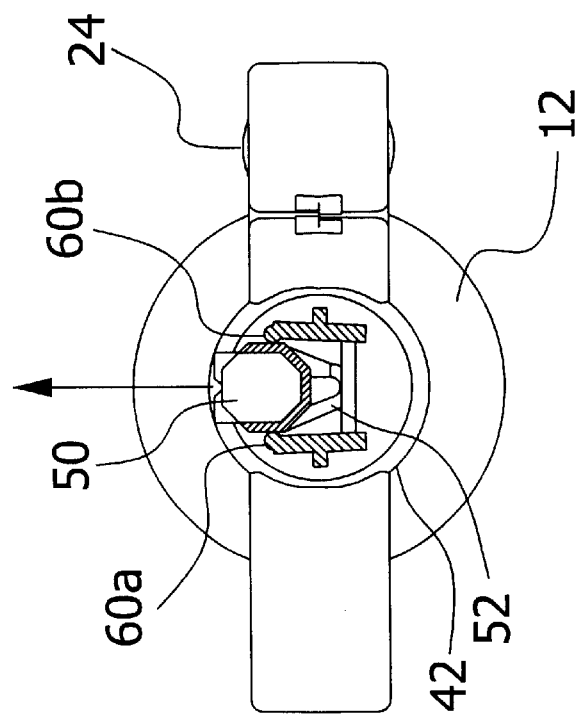
FIG. 7 is a cross sectional view taken along line 6—6 of FIG. 5 with the line level partially removed from the handle post structure.
Figure 6:
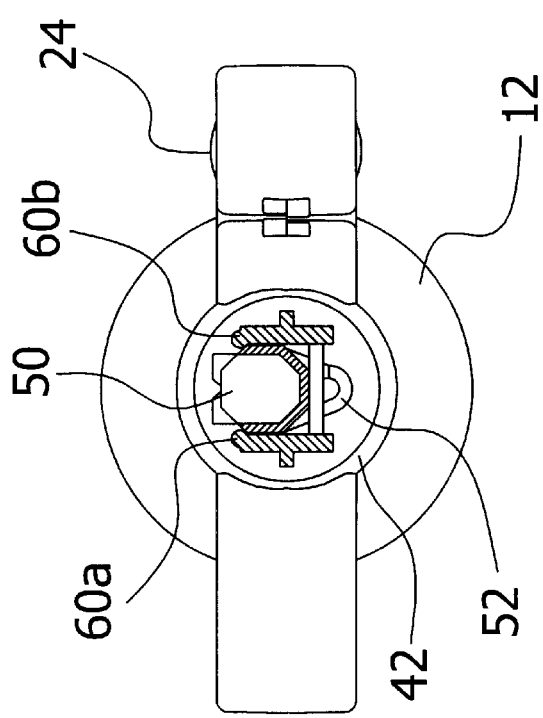
FIG. 6 is a cross sectional view taken along line 6—6 of FIG. 5.

The receiver slot 49 is preferably formed substantially parallel within the handle post structure 44 as shown in FIG. 4b of the drawings, however various other positions may be utilized. The receiver slot 49 preferably is formed such that to allow for easy insertion and removal of the line level 50 as shown in FIG. 4a of the drawings. A plurality of first nubs 60a–d extend into the receiver slot 49 from the handle post structure 44 for catchably retaining the line level 50 within the receiver slot 49 when fully positioned within the receiver slot 49. FIG. 6 illustrates the first nubs 60a–d retaining the line level 50 within the receiver slot 49. FIG. 7 illustrates the line level 50 being partially removed from the receiver slot 49.

The handle post structure 44 preferably includes a center aperture 47 within for allowing access to the line level 50 from the opposing side of the handle post structure 44 as shown in FIG. 3 of the drawings. A first aperture 45 and a second aperture 46 preferably extend through the handle post structure 44 at opposing ends of the receiver slot 49 for receiving the hooks 52, 54 of the line level 50 when the line level 50 is fully inserted within the receiver slot 49 as further shown in FIGS. 2 and 3 of the drawings.

Figure 2:
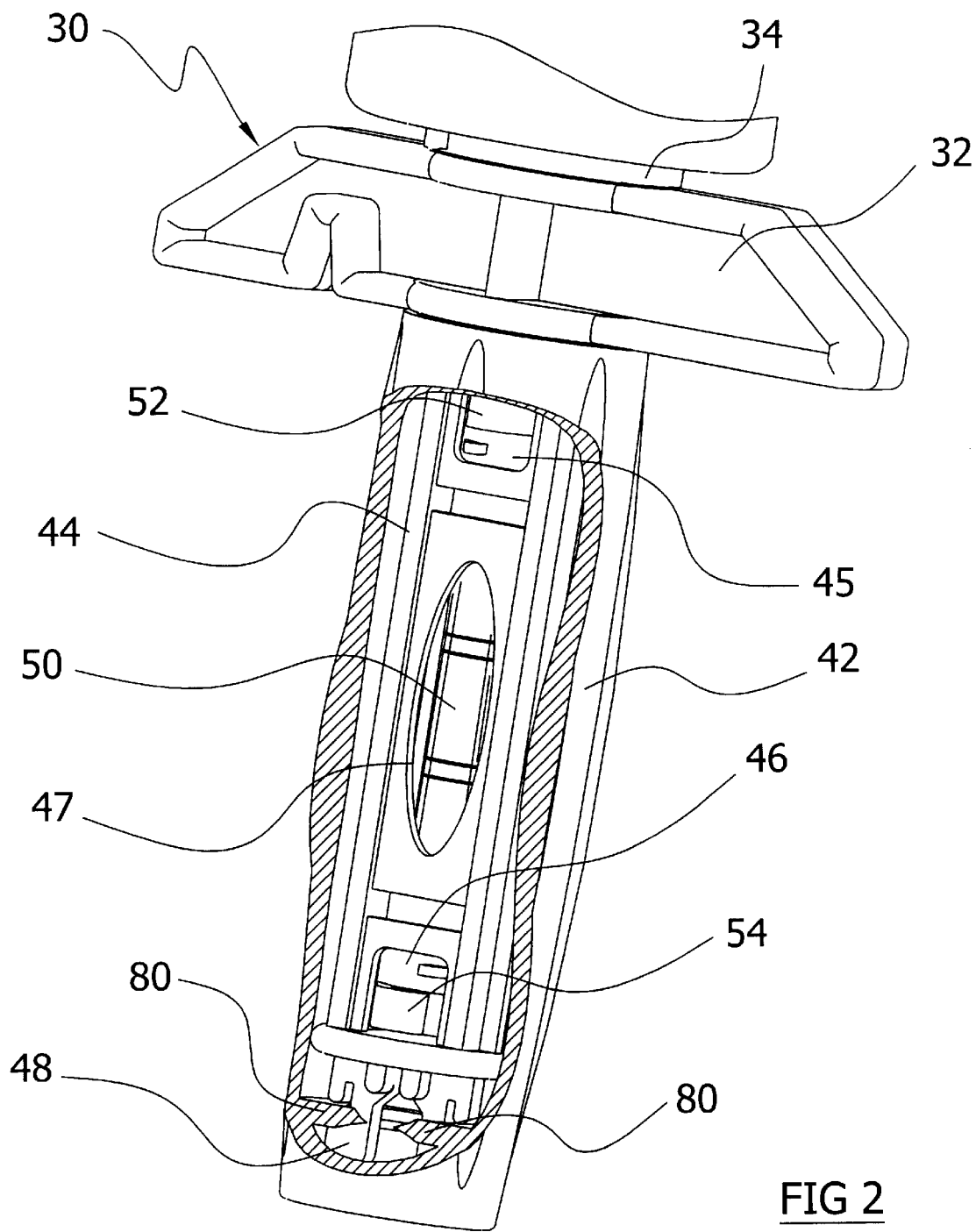
FIG. 2 is an partial cutaway view of the handle disclosing the line level contained within.

As shown in FIGS. 2 through 5 of the drawings, the handle structure 40 includes a plurality of engaging prongs 48 attached to the distal end of the handle post structure 44. The engaging prongs 48 catchably mate with a cincture structure 80 within the interior end portion of the handle cover 42 as shown in FIG. 2 of the drawings. The cincture structure 80 extends inwardly in a radial manner with a center opening within for inserting the engaging prongs 48 catchably into.

The handle cover 42 has an upper opening that is rotatably received upon a corresponding upper portion of the handle post structure 44. The handle cover 42 is comprised of an elongate tubular structure as shown FIG. 2 of the drawings. The interior lumen of the handle cover 42 is sufficient in size to slidably receive the handle post structure 44. The cincture structure 80 preferably freely rotates about the engaging prongs 48 thereby allowing the second shoulder 30, shank 34 and first shoulder 20 to freely rotate with respect to handle cover 42. It can be appreciated that the handle cover 42 is non-rotatably attached to the handle structure 40 in various other embodiments of the present invention.

To utilize the main embodiment of the invention as illustrated in FIGS. 1 through 7 of the drawings, the user first removes the handle cover 42 from the handle post structure 44 thereby exposing the receiver slot 49. The user then inserts the line level 50 into the receiver slot 49 until catchably received within the receiver slot 49. The user then repositions the handle cover 42 upon the handle post structure 44 until the engaging prongs 48 catchably are positioned within the cincture structure 80. When the user desires to access and utilize the line level 50, the user simply grasps the second shoulder 30 and the handle cover 42 while applying a longitudinal force to the handle cover 42 away from the second shoulder 30 as shown in FIG. 3 of the drawings. The cincture structure 80 passes about the engaging prongs 48 thereby allowing the handle cover 42 to be completely removed from the handle post structure 44. The user then engages the line level 50 and removes the line level 50 from the receiver slot 49 of the handle post structure 44 as shown in FIG. 4b of the drawings. The user then may reattach the handle cover 42 about the handle post structure 44 while utilizing the line level 50 or the user may wait until usage of the line level 50 is completed.

Figure 8:
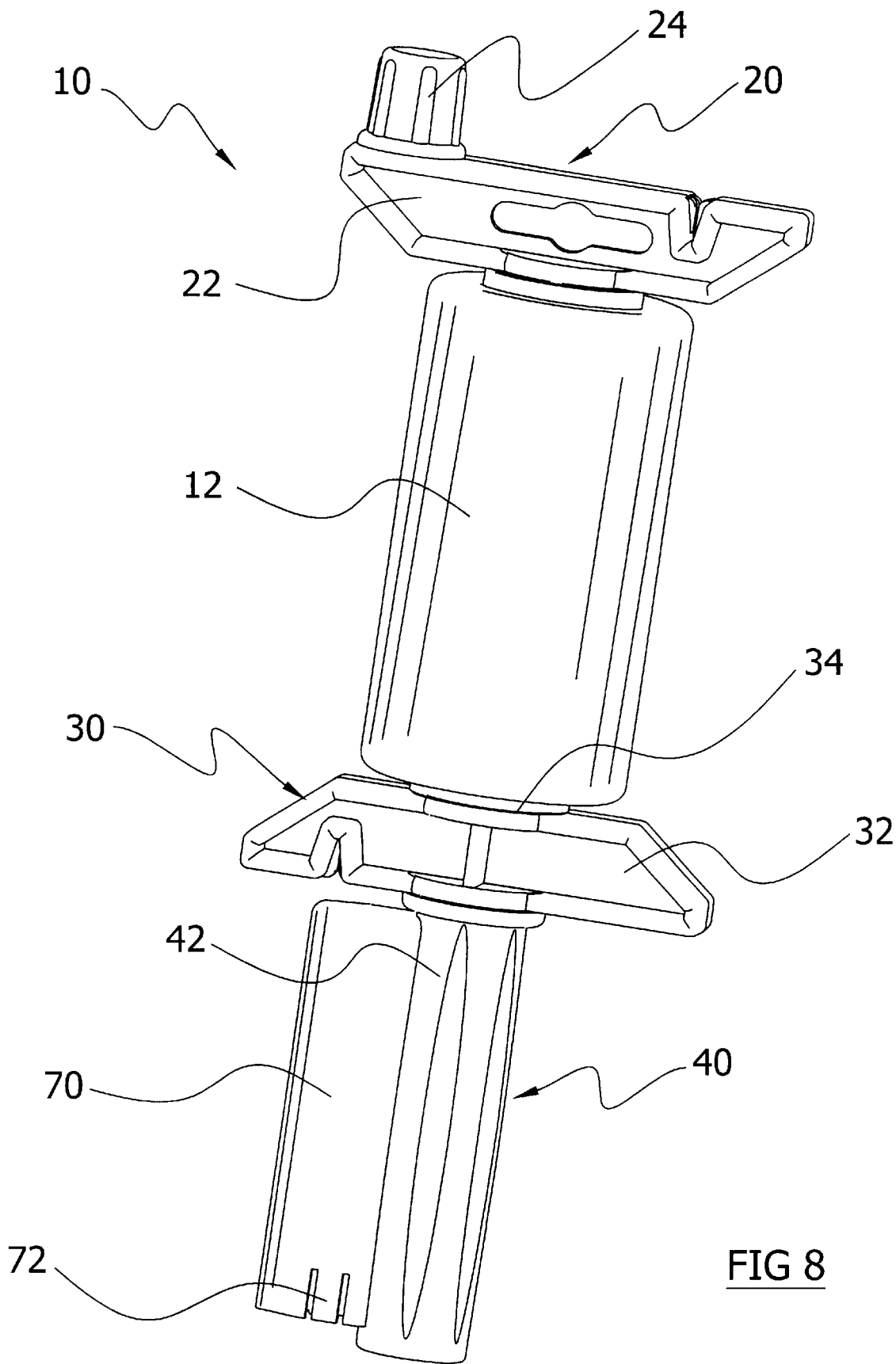
FIG. 8 is an upper perspective view of a second embodiment of the present invention disclosing a handle case for storing the line level.
Figure 9:
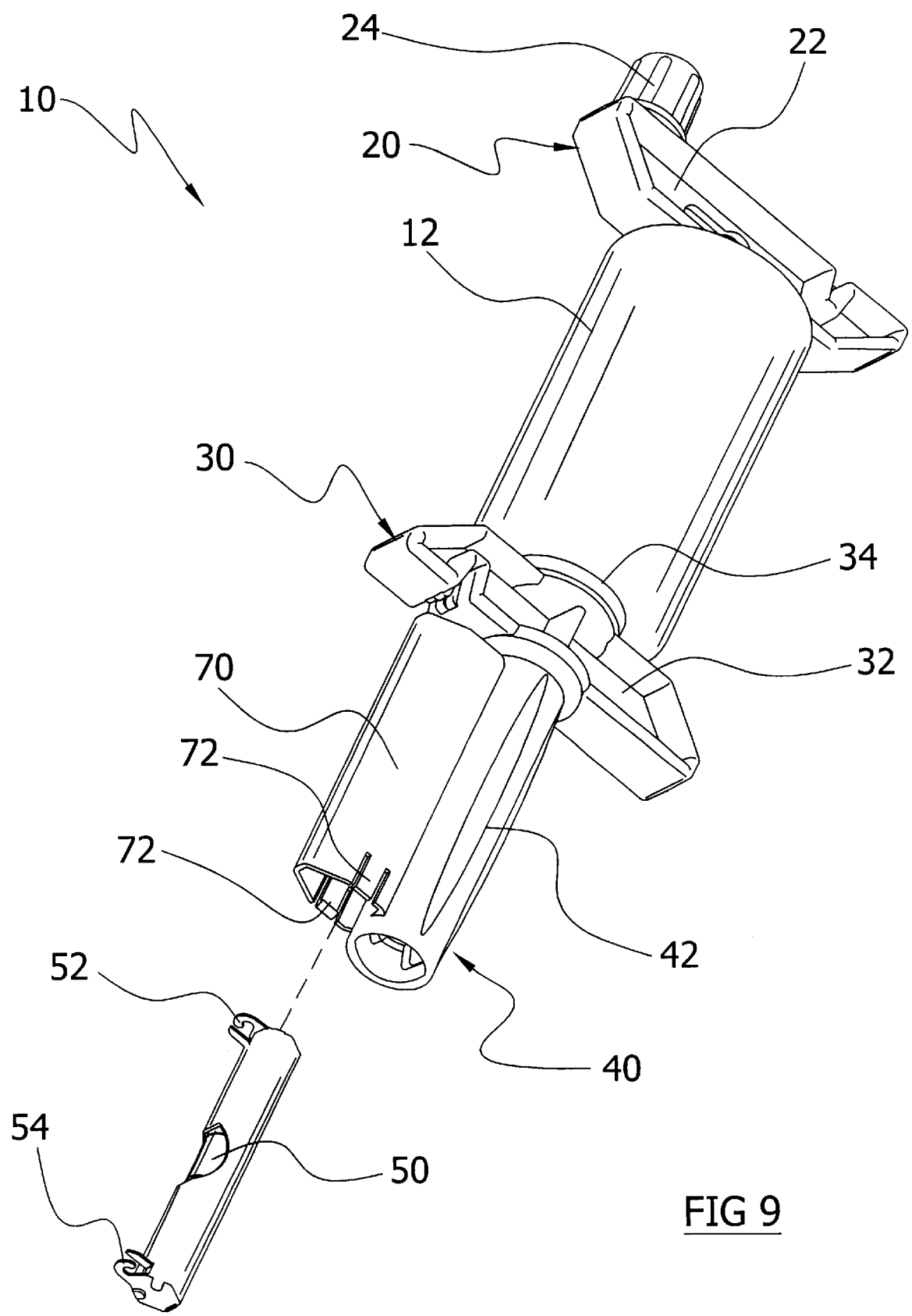
FIG. 9 is an upper perspective view of the second embodiment with the line level removed from the handle case.

In a second embodiment of the present invention illustrated in FIGS. 8 and 9 of the drawings, a storage compartment 70 is attached to the side of the handle cover 42. The storage compartment 70 has a lower aperture for receiving the line level 50 as best shown in FIG. 9 of the drawings. A pair of opposing catch members 72 adjacent the lower aperture catchably retain the line level 50 within the storage compartment 70 during non-usage of the line level 50. To remove the line level 50 from the storage compartment 70, the user simply expands the catch members 72 to allow for the line level 50 to freely be removed from interior of the storage compartment 70. Various other shapes and structures may be utilized to construct the storage compartment 70 other than illustrated in FIGS. 8 and 9 of the drawings.

Figure 10:
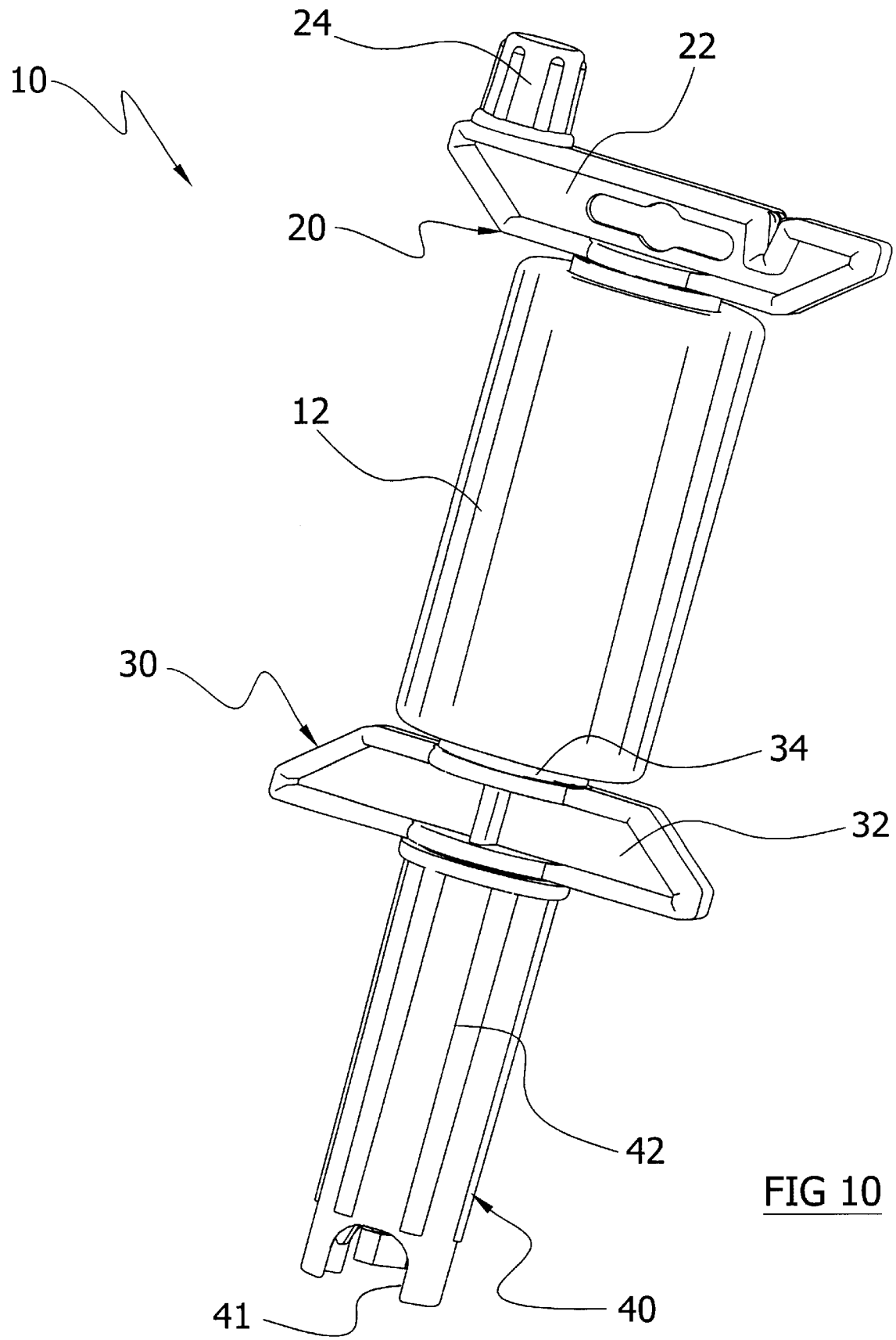
FIG. 10 is an upper perspective view of a third embodiment of the present invention.
Figure 11:
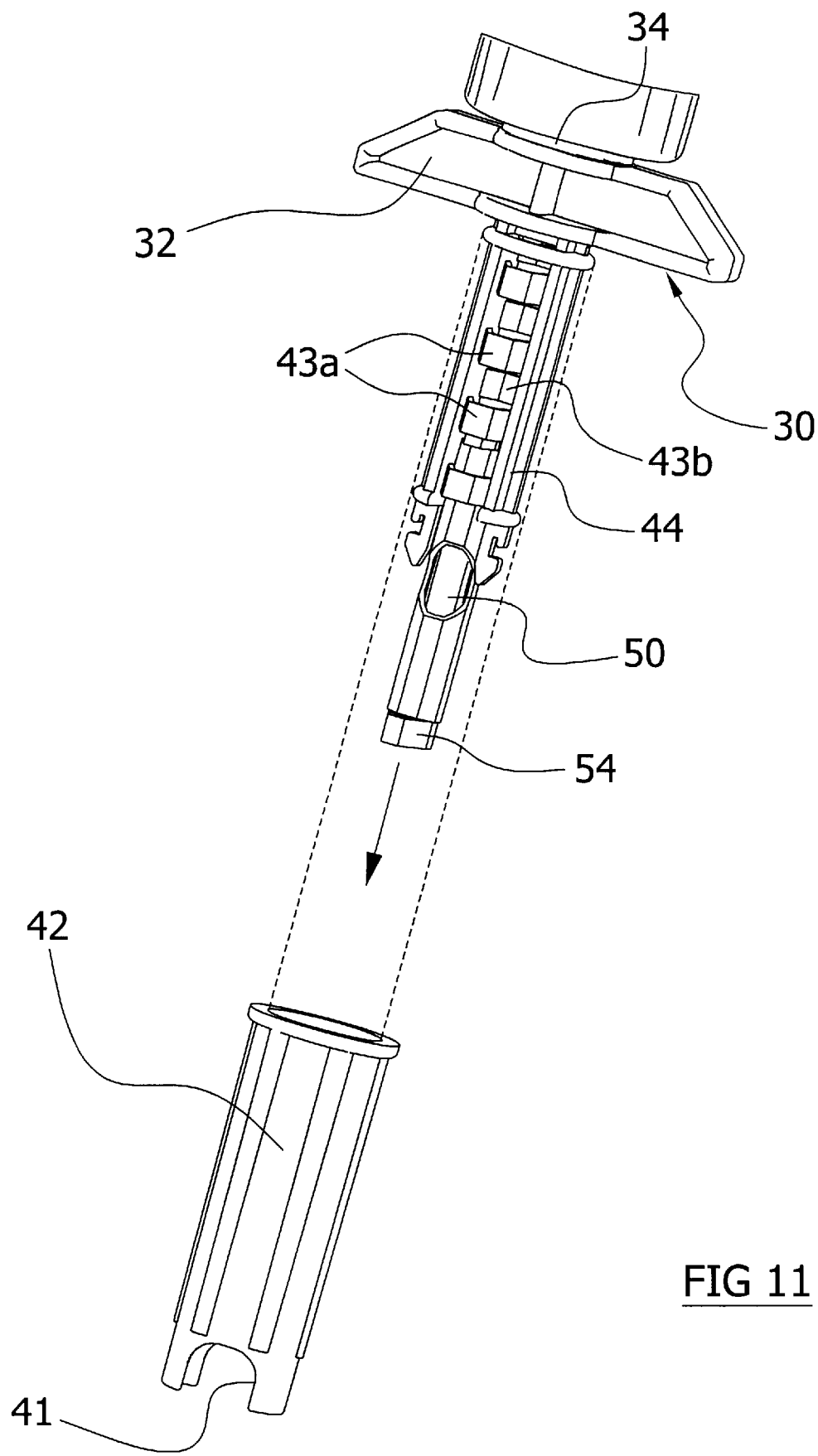
FIG. 11 is an upper perspective view of the third embodiment with the handle cover removed illustrating the line level retained within the hand post structure.
Figure 14:
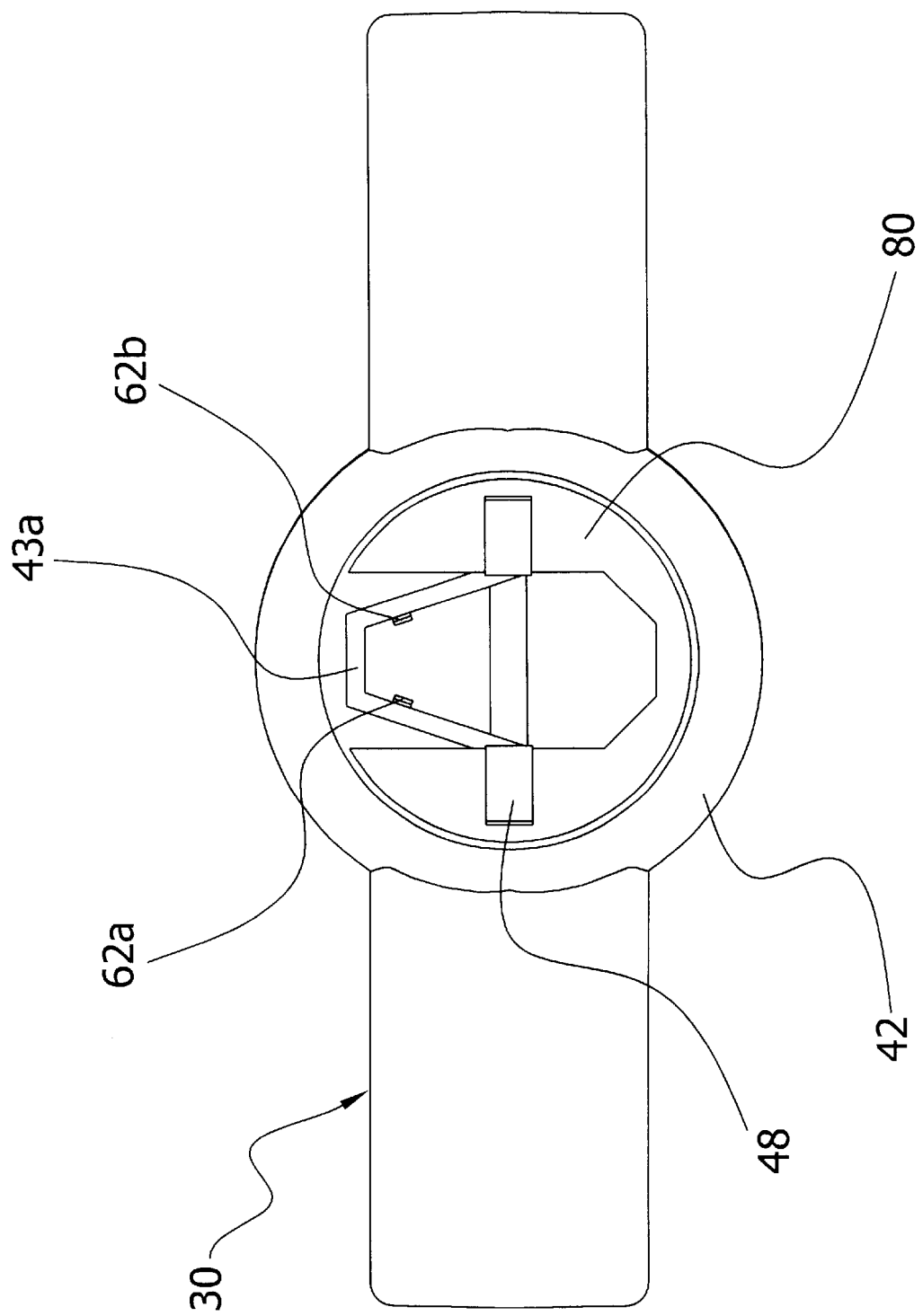
FIG. 14 is an end view of the third embodiment illustrating the retaining structure for retaining the line level within.

In a third embodiment of the present invention illustrated in FIGS. 10, 11 and 14 of the drawings, a plurality of opposing rib members 43a–b formed to the shape of the line level 50 are attached to the handle post structure 44 about the receiver slot 49. The line level 50 is longitudinally inserted and removed from the receiver slot 49 through a lower opening 41 within the handle cover 42 thereby not requiring the removal of the handle cover 42 to access the line level 50. The rib members 43a–b preferably snugly receive the line level 50 as shown in FIG. 11 of the drawings. A plurality of second nubs 62a–b preferably engage the line level 50 for retaining the line level 50 within the receiver slot 49 during storage thereof. The second nubs 62a–b preferably catch the interior edge of one of the hooks 52, 54 when the line level 50 is fully inserted within the handle post structure 44.

Figure 12:
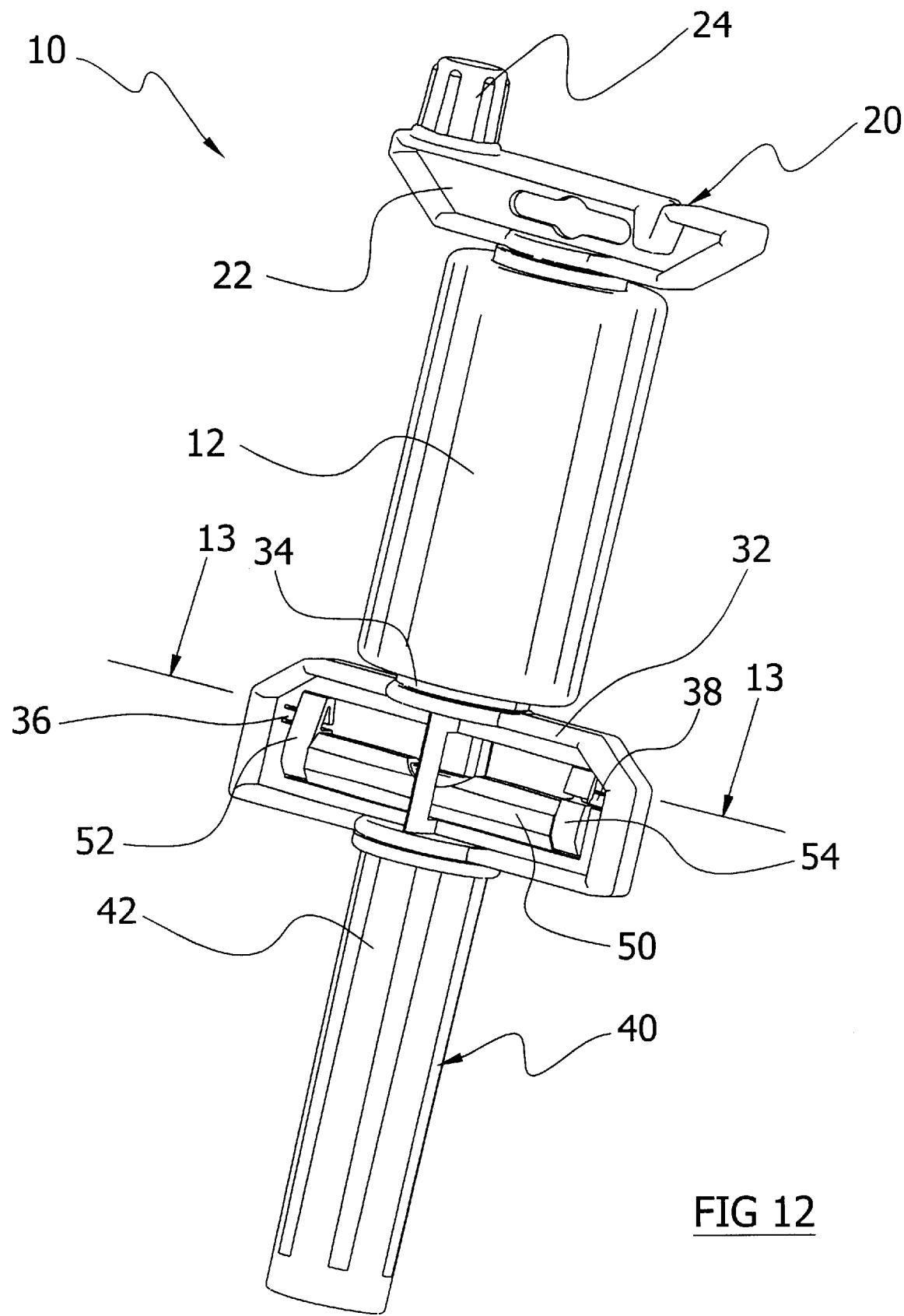
FIG. 12 is an upper perspective view of a fourth embodiment of the present invention with the line level in the second shoulder structure.
Figure 13:
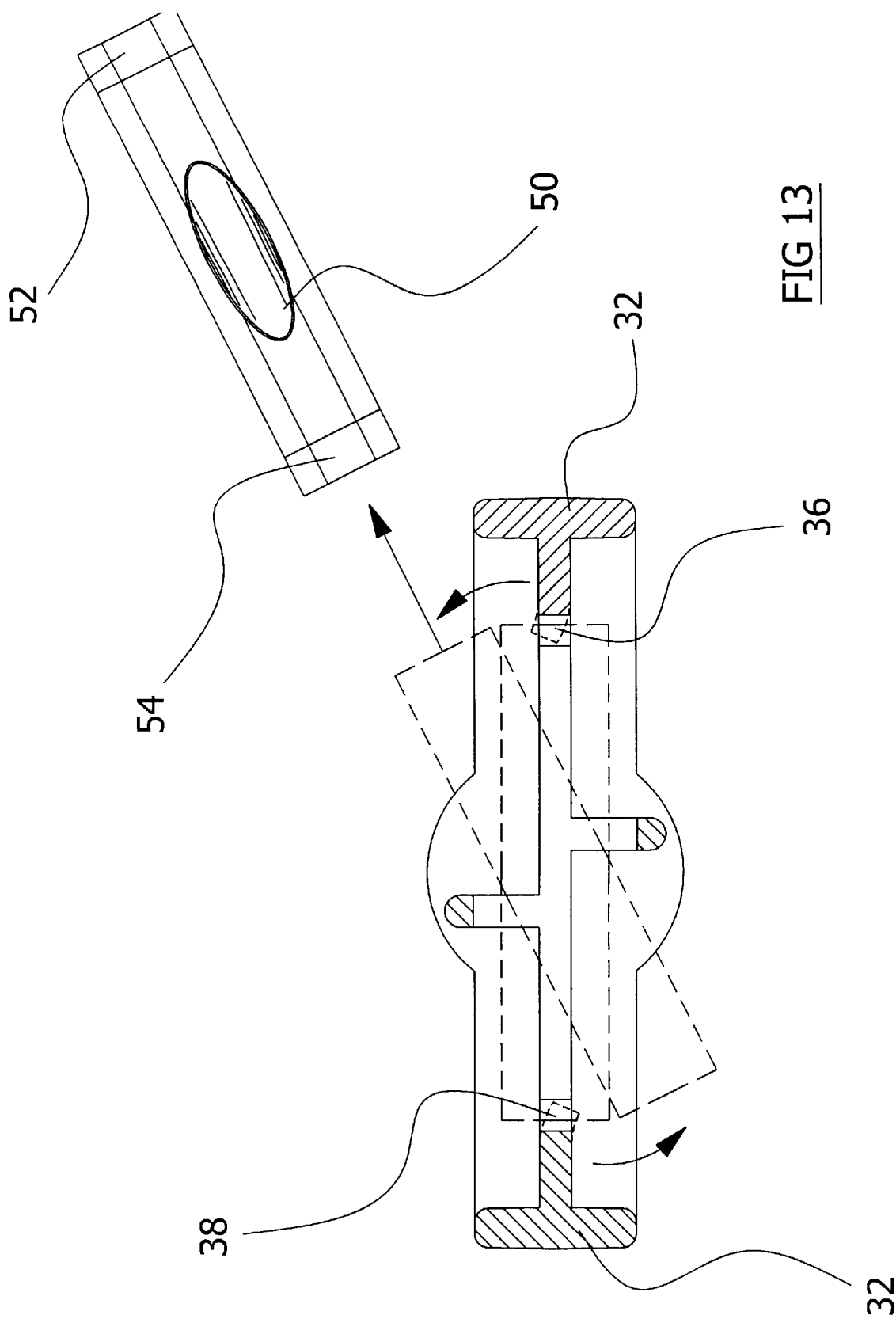
FIG. 13 is a cross sectional view taken along line 13—13 of FIG. 12 illustrating the line level being rotated then removed from the second shoulder structure of the fourth embodiment.

In a fourth embodiment of the present invention illustrated in FIGS. 12 and 13 of the drawings, the second body 32 within the second shoulder 30 has an open structure with a first member 36 and a second member 38 extending inwardly from opposing sides of the second body 32. The first member 36 and the second member 38 catchably receive the hooks 52, 54 respectively in a manner substantially traverse to the shank 34 as best illustrated in FIG. 12 of the drawings. To remove the line level 50 from the second shoulder 30, the user simply rotates the line level 50 from within the second shoulder 30 and then removes the line level 50 as shown in FIG. 13 of the drawings. It can be appreciated that the fourth embodiment may also be applied within the first shoulder 20 similar to the second shoulder 30.

In a fifth embodiment of the present invention not illustrated in the drawings, the first shoulder 20 is removable from the shank 34 thereby exposing a distal opening within the shank 34 that removably receives the line level 50. The line level 50 may be retained within the shank 34 by nubs or similar frictional engagement structure. The line level 50 may also be retained within the shank 34 by simply securing the first shoulder 20 within the distal opening upon the shank 34.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A material dispensing apparatus for dispensing and storing elongate material and for storing a line level, comprising:
    a frame;
    a post attached to said frame;
    a receiver slot within said post for receiving said line level; and
    a cover attached about said post.

2. The material dispensing apparatus of claim 1, wherein said receiver slot frictionally receives said line level.

3. The material dispensing apparatus of claim 1, wherein said receiver slot includes a plurality of nubs for catchably retaining said line level within said receiver slot.

4. The material dispensing apparatus of claim 1, wherein said cover is removably attached about said post.

5. The material dispensing apparatus of claim 4, wherein said post includes a plurality of engaging prongs extending from a distal end thereof, and wherein said cover is comprised of a tubular structure having a cincture structure within for catchably receiving said engaging prongs.

6. The material dispensing apparatus of claim 5, wherein said cover is rotatably attached about said post.

7. The material dispensing apparatus of claim 1, wherein said cover is rotatably attached about said post.

8. The material dispensing apparatus of claim 1, wherein said cover includes a lower opening for providing access to said line level.

9. The material dispensing apparatus of claim 8, including a plurality of rib members within said receiver slot formed to snugly receive said line level in a longitudinal manner.

10. The material dispensing apparatus of claim 1, wherein said receiver slot includes a first aperture and a second aperture extending through said post for receiving a first hook and a second hook of said line level respectively.

11. A material dispensing apparatus for dispensing and storing elongate material, comprising:
    a frame;
    a post attached to said frame;
    a receiver slot within said post;
    a line level removably positioned within said receiver slot; and
    a cover attached about said post.

12. The material dispensing apparatus of claim 11, wherein said receiver slot frictionally receives said line level.

13. The material dispensing apparatus of claim 11, wherein said receiver slot includes a plurality of nubs for catchably retaining said line level within said receiver slot.

14. The material dispensing apparatus of claim 11, wherein said cover is removably attached about said post.

15. The material dispensing apparatus of claim 14, wherein said post includes a plurality of engaging prongs extending from a distal end thereof, and wherein said cover is comprised of a tubular structure having a cincture structure within for catchably receiving said engaging prongs.

16. The material dispensing apparatus of claim 15, wherein said cover is rotatably attached about said post.

17. The material dispensing apparatus of claim 11, wherein said cover is rotatably attached about said post.

18. The material dispensing apparatus of claim 11, wherein said cover includes a lower opening for providing access to said line level.

19. The material dispensing apparatus of claim 18, including a plurality of rib members within said receiver slot formed to snugly receive said line level in a longitudinal manner.

20. A method of utilizing an elongate material dispensing apparatus having a storage location for storing a line level, said method comprising the steps of:
    (a) utilizing said material dispensing apparatus to dispense a length of elongate material;
    (b) removing said line level from said storage location;
    (c) attaching said line level upon said length of elongate material;
    (d) removing said line level from said length of elongate material; and
    (e) positioning said line level within said storage location upon said material dispensing apparatus.

* * * * *